(12) United States Patent
Chen Larsson et al.

(10) Patent No.: US 11,432,286 B2
(45) Date of Patent: *Aug. 30, 2022

(54) METHODS AND APPARATUS IN A WIRELESS COMMUNICATION SYSTEM FOR TRANSMITTING AND RECEIVING USER DATA ON A CARRIER

(71) Applicant: TELEFONAKTIEBOLAGET LM ERICSSON (PUBL), Stockholm (SE)

(72) Inventors: Daniel Chen Larsson, Lund (SE); Robert Baldemair, Solna (SE); Jung-Fu Cheng, Fremont, CA (US); Mattias Frenne, Uppsala (SE); Havish Koorapaty, Saratoga, CA (US); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,343

(22) Filed: Oct. 14, 2019

(65) Prior Publication Data

US 2020/0045704 A1    Feb. 6, 2020

Related U.S. Application Data

(63) Continuation of application No. 14/386,520, filed as application No. PCT/SE2013/050299 on Mar. 19, 2013, now Pat. No. 10,448,396.

(Continued)

(51) Int. Cl.
*H04W 72/04* (2009.01)
*H04L 5/00* (2006.01)

(52) U.S. Cl.
CPC ......... *H04W 72/0453* (2013.01); *H04L 5/001* (2013.01); *H04L 5/0053* (2013.01)

(58) Field of Classification Search
CPC ................................................. H04W 72/0453
See application file for complete search history.

(56) References Cited

U.S. PATENT DOCUMENTS 10,448,396 B2 * 10/2019 Larsson ............ H04W 72/0453
10,701,607 B2 *  6/2020 Mazzarese .......... H04W 72/042
(Continued)

FOREIGN PATENT DOCUMENTS

WO    2010025279 A1    3/2010
WO    2013006101 A1    1/2013

OTHER PUBLICATIONS

Author Unknown, "'3rd Generation Partnership Project; Technical Specification Group Radio Access Network; Evolved Universal Terrestrial Radio Access (E-UTRA);User Equipment (UE) radio transmission and reception (Release 10),'" 3GPP TS 36.101 V10.5.0, Dec. 2011, 3GPP Organizational Partners, 288 pages.
(Continued)

*Primary Examiner* — Jason E Mattis
(74) *Attorney, Agent, or Firm* — Withrow & Terranova, PLLC

(57) ABSTRACT

A base station is configured to transmit user data to a wireless device upon a first carrier. The base station identifies, from a set of transmission resources that is nominally allocated for transmission of user data upon the first carrier, a subset of transmission resources that is also nominally allocated for transmission of a reference or control signal either by the base station upon a second carrier or by a neighboring base station upon the first carrier. The base station selectively transmits user data to the wireless device upon the first carrier exclusive of this identified subset of transmission resources. The device in some embodiments obtains information indicating that the base station is selectively transmitting user data upon the first carrier exclusive of the subset in this way. Based on this information, the (Continued)

device recovers user data received upon the first carrier exclusive of the subset of transmission resources.

23 Claims, 13 Drawing Sheets

Related U.S. Application Data

(60) Provisional application No. 61/612,733, filed on Mar. 19, 2012.

(56) References Cited

U.S. PATENT DOCUMENTS

| | | | |
|---|---|---|---|
| 2010/0054161 | A1 | 3/2010 | Montojo et al. |
| 2011/0170496 | A1 | 7/2011 | Fong et al. |
| 2011/0206157 | A1 | 8/2011 | Xu et al. |
| 2011/0230144 | A1 | 9/2011 | Siomina et al. |
| 2012/0039268 | A1 | 2/2012 | Häkkinen et al. |
| 2012/0039282 | A1 | 2/2012 | Kim et al. |
| 2012/0076106 | A1 | 3/2012 | Bhattad et al. |
| 2012/0082119 | A1 | 4/2012 | Chung et al. |
| 2012/0087321 | A1 | 4/2012 | Han et al. |
| 2013/0039203 | A1 | 2/2013 | Fong et al. |
| 2013/0279359 | A1* | 10/2013 | Zhang .................. H04L 5/0035 370/252 |
| 2015/0071201 | A1 | 3/2015 | Larsson et al. |

OTHER PUBLICATIONS

Non-Final Office Action for U.S. Appl. No. 14/386,520, dated Jan. 6, 2016, 14 pages.

Final Office Action for U.S. Appl. No. 14/386,520, dated May 20, 2016, 16 pages.

Non-Final Office Action for U.S. Appl. No. 14/386,520, dated Mar. 24, 2017, 16 pages.

Final Office Action for U.S. Appl. No. 14/386,520, dated Oct. 5, 2017, 20 pages.

Advisory Action for U.S. Appl. No. 14/386,520, dated Feb. 16, 2018, 7 pages.

Non-Final Office Action for U.S. Appl. No. 14/386,520, dated Jun. 18, 2018, 20 pages.

Final Office Action for U.S. Appl. No. 14/386,520, dated Mar. 8, 2019, 22 pages.

Applicant-Initiated Interview Summary for U.S. Appl. No. 14/386,520, dated Apr. 24, 2019, 3 pages.

Advisory Action for U.S. Appl. No. 14/386,520, dated May 10, 2019, 3 pages.

Notice of Allowance for U.S. Appl. No. 14/386,520, dated Aug. 26, 2019, 6 pages.

Examination Report for European Patent Application No. 13717077.5, dated Dec. 11, 2015, 5 pages.

Extended European Search Report for European Patent Application No. 18172457.6, dated Sep. 17, 2018, 10 pages.

International Search Report and Written Opinion for International Patent Application No. PCT/SE2013/050299, dated Nov. 14, 2013, 14 pages.

\* cited by examiner

Aggregated bandwidth of 100 MHz

■ CRS  ⊘ PCFICH/PDCCH/PHICH  ≡ BCH/PSS/SSS
◊ PDSCH (INCL ePDCCH)  ▦ "HOLE"

CARRIER TYPE A
PRIOR ART

CARRIER TYPE B
PRIOR ART

"HOLE" (EMPTY SPACE)

Table 1: Transmission bandwidth configuration $N_{RB}$ in E-UTRA channel bandwidths

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |
| Transmission bandwidth [MHz] | 1.08 | 2.7 | 4.5 | 9.0 | 13.5 | 18.0 |

Figure 18

> CELL 1

> CELL 2
MUTED CRS IN
LOCATIONS USED
BY OTHER CELL

> CELL 3

> CELL 4

METHODS AND APPARATUS IN A WIRELESS COMMUNICATION SYSTEM FOR TRANSMITTING AND RECEIVING USER DATA ON A CARRIER

RELATED APPLICATIONS

The present application is a continuation of U.S. patent application Ser. No. 14/386,520, filed Sep. 19, 2014, now granted as U.S. Pat. No. 10,448,396 on Oct. 15, 2019, which is a national stage application of International Patent Application No. PCT/SE2013/050299, filed Mar. 19, 2013, which claims priority to U.S. Provisional Patent Application Ser. No. 61/612,733, which was filed Mar. 19, 2012 and are incorporated herein in their entirety by reference.

TECHNICAL FIELD

The present application generally relates to a wireless communication system, and particularly relates to user data being transmitted between a base station and a wireless device upon a first carrier in the wireless communication system.

BACKGROUND

Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element (RE) corresponds to one OFDM subcarrier during one OFDM symbol interval.

In the time domain, LTE downlink transmissions are organized into radio frames of 10 ms, as shown in FIG. 2. Each radio frame consists of ten equally-sized subframes of length Tsubframe=1 ms.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of e.g. the control information. A downlink system with CFI=3 OFDM symbols as control is illustrated in FIG. 3.

The LTE Rel-10 specifications have recently been standardized, supporting Component Carrier (CC) bandwidths up to 20 MHz, which is the maximal LTE Rel-8 carrier bandwidth. Hence, an LTE Rel-10 operation wider than 20 MHz is possible and appear as a number of LTE carriers to an LTE Rel-10 terminal.

In particular for early LTE Rel-10 deployments it can be expected that there will be a smaller number of LTE Rel-10-capable terminals (i.e., non-legacy terminals) compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least has the possibility to have, the same structure as a Rel-8 carrier. CA is illustrated in FIG. 4.

The Rel-10 standard supports up to 5 aggregated carriers where each carrier is limited in the RF specifications to have one of six bandwidths namely 6, 15, 25, 50, 75 or 100 RB, corresponding to 1.4, 3 5 10 15 and 20 MHz respectively.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in the network may be different from the number of CCs seen by a terminal: A terminal may for example support more downlink CCs than uplink CCs, even though the network offers the same number of uplink and downlink CCs.

During initial access a LTE Rel-10 terminal behaves similar to a LTE Rel-8 terminal. Upon successful connection to the network a terminal may—depending on its own capabilities and the network—be configured with additional CCs in the UL and DL. Configuration is based on Radio Resource Control (RRC). Due to the heavy signaling and rather slow speed of RRC signaling it is envisioned that a terminal may be configured with multiple CCs even though not all of them are currently used. If a terminal is activated on multiple CCs this would imply it has to monitor all downlink (DL) CCs for Physical Downlink Control Channel (PDCCH) and Physical Downlink Shared Channel (PDSCH). This implies a wider receiver bandwidth, higher sampling rates, etc. resulting in high power consumption.

Two types of carriers are referred to herein. The first type of carrier is a Rel-8 backward compatible carrier. It is characterized by that Rel-8, Rel-9 and Rel-10 User Equipment (UE) can operate on it. For simplicity it is referred to as carrier type A.

The second carrier type is described as a carrier type that contains either no CRS at all or much less CRS either in frequency, by for example a reduction of the bandwidth the CRS covers to be smaller than the carrier bandwidth, or in time, by for example not transmitting any CRS in some pre-defined subframes, or in both frequency and time compared to a type A carrier. It further may not contain any PDCCH but only the enhanced Control Channels eCCH including the enhanced PDCCH (ePDCCH) and/or the enhanced Physical Hybrid Automatic Retransmission reQuest (HARQ) Indicator Channel (ePHICH), which do not rely on CRS for demodulation. This type of carrier is referred to as carrier type B. Carrier type B is attractive for its energy efficiency properties, its low control and reference signal overhead and low level of interference generation in networks when compared to carrier type A.

The lack of CRS and/or PDCCH, PHICH, PCFICH will make this type of carrier, i.e., carrier type B, not accessible by legacy release UEs when deployed, i.e. it is not backwards compatible. Carrier type A and carrier type B are illustrated in FIG. 5 and FIG. 6 respectively.

The definition of the fields used in FIG. 5 are shown in FIG. 5 only and will be used also in relation to other figures herein even if left out from those figures. More specifically, FIG. 5 shows carrier type A in time (along the horizontal axis) and in frequency (along the vertical axis). FIG. 5 shows the carrier structured in time as 5 different subframes. In general, the Physical Control Format Indicator Channel/Physical Downlink Control Channel/Physical Hybrid ARQ Indicator Channel (PCFICH/PDCCH/PHICH) occupies the beginning of each subframe across the carrier bandwidth, and the PDSCH (including the ePDCCH) occupies the rest of each subframe. That said, the CRS is transmitted in a pattern across the carrier, and in FIG. 5 shows up as "dots" distributed over the figure. By contrast, FIG. 6 shows that carrier type B does not transmit the PCFICH/PDCCH/PHICH, and only transmits CRS within the second subframe and across a portion of the carrier bandwidth (outlined as a rectangle within the second subframe). In both FIGS. 5 and 6, the Physical Broadcast Channel/Primary Synchronization Signal/Secondary Synchronization Signal (PBCH/PSS/SSS) is transmitted within this rectangle, after the PCFICH/PDCCH/PHICH (in FIG. 5).

Carrier type B can only be accessible by terminals of the new release and not of legacy releases as it is non-backward compatible. At the time when carrier type B will be deployed in networks there will only be limited set of such new release terminals available that has the capability to access it and receive data on it. At the same time there will be a large population of legacy release terminals operating in existing networks, i.e. terminals only capable of accessing carriers of type A.

SUMMARY

It is an object of one or more embodiments herein to address these and other problems.

This and similar objects are achieved by a base station in a wireless communication system configured to transmit user data to a wireless device upon a first carrier. The base station comprises one or more interfaces configured to communicatively couple the base station to the wireless communication system. The base station also comprises one or more transmitter processing circuits.

The one or more transmitter processing circuits are configured to identify, from a set of transmission resources that is nominally allocated for transmission of user data upon the first carrier, a subset of transmission resources that is also nominally allocated for transmission of a reference or control signal either by the base station upon a second carrier or by a neighboring base station upon the first carrier. The one or more transmitter processing circuits are further configured to selectively transmit user data to the wireless device upon the first carrier exclusive of the identified subset of transmission resources.

In some embodiments, the one or more transmitter processing circuits are configured to selectively transmit user data by selectively mapping user data upon the first carrier around the identified subset of transmission resources. In this case, for example, the circuits generate an amount of user data to be transmitted to match an actual allocation of transmission resources for user data upon the first carrier. This actual allocation accounts for the selective mapping of user data around the identified subset of transmission resources.

In other embodiments, by contrast, the one or more transmitter processing circuits are configured to selectively transmit user data by puncturing user data on the identified subset of transmission resources. In this case, for example, the one or more transmitter processing circuits are further configured to generate an amount of user data to be transmitted to match the nominal allocation of transmission resources for user data upon the first carrier. This nominal allocation does not account for the selective transmission of user data exclusive of the identified subset of transmission resources.

Regardless, the one or more transmitter processing circuits in some embodiments are configured to transmit information to the wireless device that explicitly or implicitly indicates this selective transmission of user data upon the first carrier exclusive of the identified subset of transmission resources. In one embodiment, for example, this information explicitly identifies at least a portion of the subset of transmission resources to the wireless device as not having user data for the wireless device. In this case, such information may comprise a reference signal muting pattern. Additionally or alternatively in another embodiment, the information explicitly identifies, for a given subframe, the first transmission resource from the start of the given subframe that is not included in the identified subset of transmission resources.

Alternatively or additionally, the one or more transmitter processing circuits in some embodiments are further configured to identify, from the set of transmission resources, a second subset of transmission resources. This second subset is exclusively allocated for transmission of user data upon the first carrier but is adjacent to transmission resources nominally or actually allocated for transmission upon the second carrier. In this case, the one or more transmitter processing circuits are configured to selectively transmit user data by selectively transmitting user data upon the first carrier also exclusive of the identified second subset of transmission resources, to create one or more virtual guard bands around the second carrier.

Note that, in at least some embodiments, the second carrier is a legacy carrier and the first carrier is a non-legacy carrier. In one such embodiment, the one or more transmitter processing circuits are configured to dynamically discontinue selective transmission of user data upon the first carrier responsive to a number of legacy wireless devices being served falling below a predefined threshold.

In another such embodiment, the reference or control signal is either not transmitted upon the first carrier or is transmitted upon the first carrier on a number of transmission resources that is smaller than a number of transmission resources on which said reference or control signal is transmitted upon the second carrier.

Regardless, in one or more embodiments, transmission resources comprise time-frequency resource elements. Moreover, the wireless communication system is based on Long Term Evolution (LTE), the reference or control signal comprises common reference symbols (CRS) or a physical downlink control channel, and the user data is transmitted upon the first carrier over a physical downlink shared channel (PDSCH).

Embodiments herein also include a wireless device a wireless communication system configured to receive user data from a base station upon a first carrier. The wireless device comprises one or more interfaces configured to communicatively couple the wireless device to the base station.

The wireless device also comprises one or more receiver processing circuits. These circuits are configured to obtain information indicating that the base station is selectively transmitting user data to the wireless device upon the first carrier exclusive of a subset of a set of transmission resources that is nominally allocated for user data upon the first carrier. This subset of transmission resources is also nominally allocated for transmission of a reference or control signal either by the base station upon a second carrier or by a neighboring base station upon the first carrier. The one or more receiver processing circuits are also configured to, based on the obtained information, recover user data received upon the first carrier exclusive of the subset of transmission resources.

In some embodiments, the one or more receiver processing circuits are configured to recover user data by demapping user data exclusive of the subset of transmission resources. In other embodiments, by contrast, the one or more receiver processing circuits are configured to recover user data by demapping user data from the set of transmission resources nominally allocated for user data and setting soft information for decoding to indicate that user data demapped from the subset of transmission resources is unreliable.

Regardless, in some embodiments, the obtained information explicitly identifies at least a portion of the subset of transmission resources to the wireless device as not having user data for the wireless device. In this case, the obtained information may comprise for instance a reference signal muting pattern. In other embodiments, though, the obtained information explicitly identifies, for a given subframe, the first transmission resource from the start of the subframe that is not included in the subset of transmission resources.

Note again that, in at least some embodiments, the second carrier is a legacy carrier and the first carrier is a non-legacy carrier. In one such embodiment, the reference or control signal is either not transmitted upon the first carrier or is transmitted upon the first carrier on a number of transmission resources that is smaller than a number of transmission resources on which said reference or control signal is transmitted upon the second carrier.

Regardless, in one or more embodiments, transmission resources comprise time-frequency resource elements. Moreover, the wireless communication system is based on Long Term Evolution (LTE), the reference or control signal comprises common reference symbols (CRS) or a physical downlink control channel, and the user data is transmitted upon the first carrier over a physical downlink shared channel (PDSCH).

Embodiments herein also include corresponding methods respectively implemented by a base station and a wireless device according to any of the above described apparatus embodiments.

It is an advantage of one or more of these embodiments that interference is mitigated between (i) the transmission of user data by the base station upon the first carrier; and (ii) the transmission of the reference or control signal either by the base station upon the second carrier or by the neighboring base station upon the first carrier.

Alternatively or additionally, an advantage of some embodiments is the first and second carriers may be deployed in an overlapping fashion in such a way that conserves scarce transmission resources, enables the immediate configuration of the first carrier as a non-legacy carrier, and simplifies the gradual phase out of the second carrier as a legacy carrier.

Alternatively or additionally, an advantage of some embodiments is that the base station enables the reference signal to be used by a wireless device for synchronizing to the neighboring base station.

BRIEF DESCRIPTION OF THE DRAWINGS

FIG. 18 illustrates a table defining how much guard band a wireless device will assume according to one or more embodiments.

DETAILED DESCRIPTION

Figure 1:
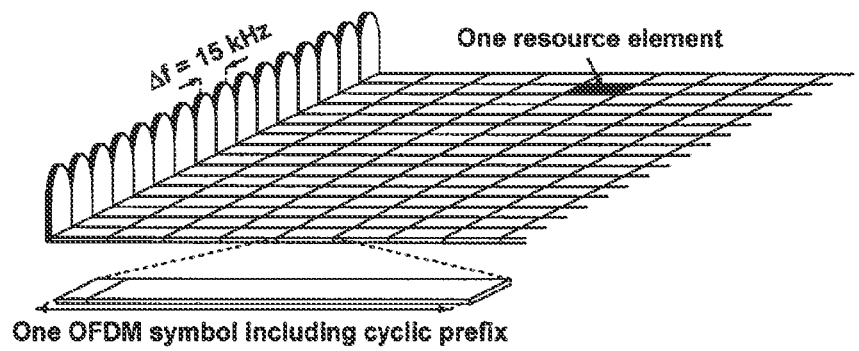
FIG. 1 illustrates the time-frequency grid for physical resources in a Long Term Evolution (LTE) wireless communication system.
Figure 2:
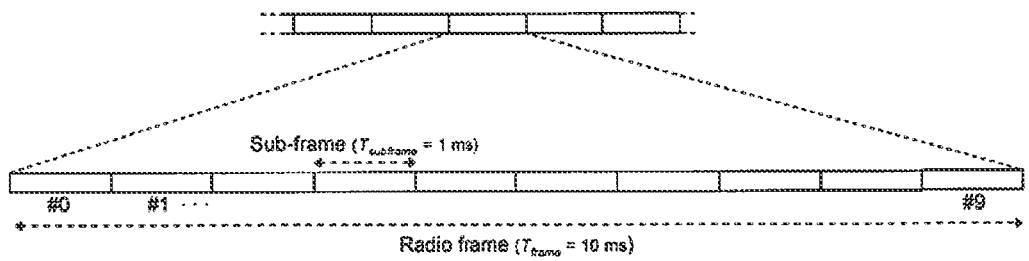
FIG. 2 illustrates organization of LTE downlink transmissions into radio frames.
Figure 3:
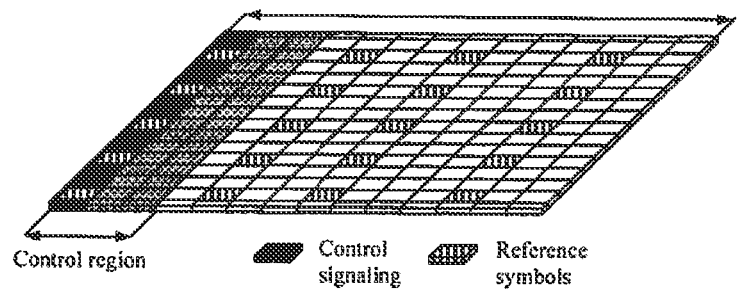
FIG. 3 illustrates a downlink LTE downlink subframe with control signaling transmitted in the first 3 OFDM symbols of the subframe.
Figure 4:
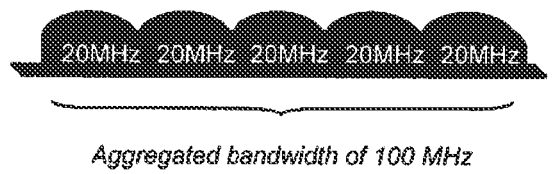
FIG. 4 illustrates carrier aggregation with an example of 5 20 MHz carriers being aggregated for a bandwidth of 100 MHz.
Figure 5:
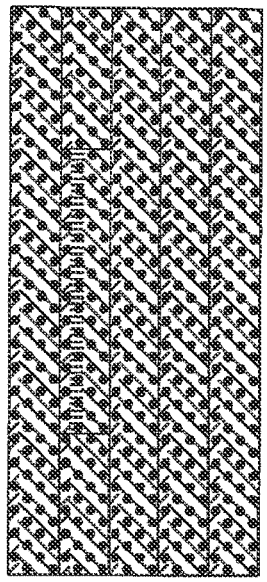
FIG. 5 shows the carrier structure of a so-called carrier type A according to one or more embodiments.
Figure 6:
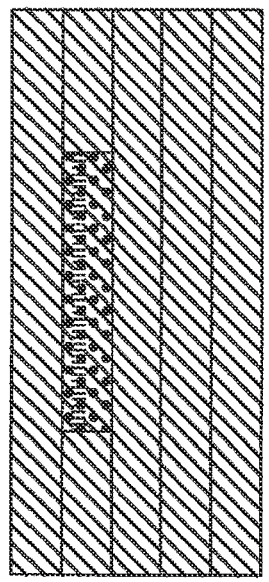
FIG. 6 shows the carrier structure of a so-called carrier type B according to one or more embodiments.
Figure 7:
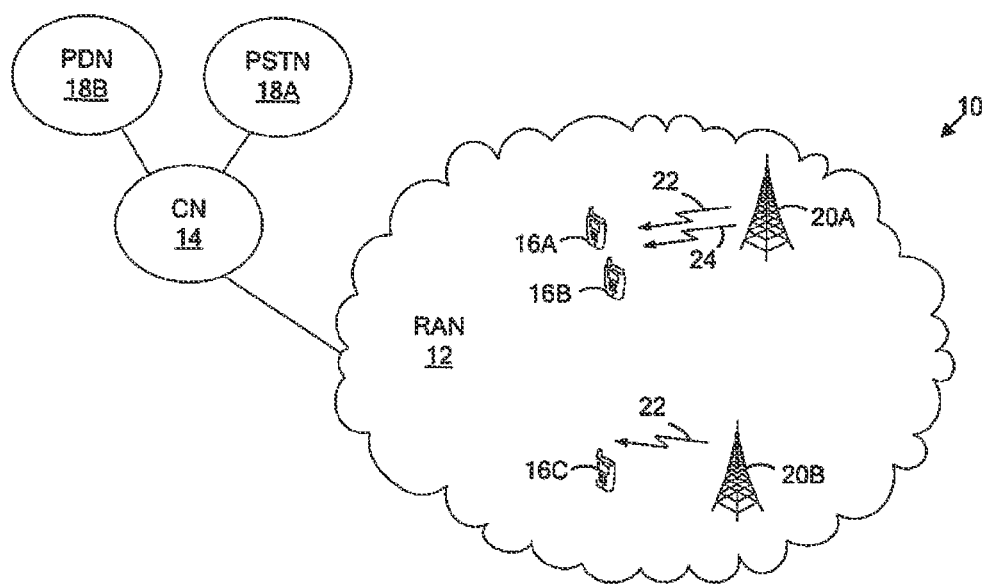
FIG. 7 is a block diagram of a wireless communication system that includes a base station and a wireless device configured according to one or more embodiments.

FIG. 7 illustrates a wireless communication system 10 according to one or more embodiments. As shown in FIG. 7, the system 10 includes a radio access network (RAN) 12 and a core network (CN) 14. The RAN 12 wirelessly connects one or more wireless devices 16 to the CN 14. Three devices 16 are shown as devices 16A, 16B, and 16C. In at least some embodiments, devices 16A and 16C are non-legacy devices while device 16B is a legacy device. A non-legacy device has capabilities that a legacy device does not, in addition to or instead of a legacy device's capabilities. Regardless, the CN 14 in turn connects the one or more wireless devices 16 to one or more external networks 18A, 18B. As shown, these one or more external networks 18A, 18B include a public switched telephone network (PSTN) 18A and a packet data network (PDN) 18B, such as the Internet.

The RAN 12 more specifically includes a plurality of base stations 20, two of which are shown as base station 20A and base station 20B. Base station 20A as shown is configured to transmit user data, e.g., the PDSCH/ePDCCH, to wireless device 16A upon a first carrier 22, e.g., of carrier type B. In some embodiments, base station 20A is further configured to transmit user data to wireless device 16A and/or 16B upon a second carrier 24, e.g., of carrier type A. Also, in some embodiments, base station 20B neighbors base station 20A and is configured to transmit user data to wireless device 16C upon the first carrier 22.

Figure 8:
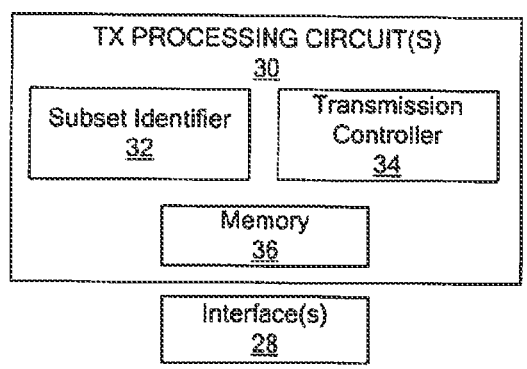
FIG. 8 is a block diagram of a base station configured to transmit user data to a wireless device upon a first carrier according to one or more embodiments.

FIG. 8 illustrates additional details of base station 20A according to some embodiments where the base station 20A is configured to transmit user data to wireless device 16A upon the first carrier 22. The base station 20A in this regard includes one or more interfaces 28, one or more transmitter (TX) processing circuits 30, and one or more additional processing circuits (not shown). The one or more interfaces 28 are configured to communicatively couple the base station 20A to the wireless communication system 10, e.g., to one or more other base stations 20 or network nodes via a network interface and to one or more wireless devices 16 via an air interface.

The one or more transmitter processing circuits 30 in some embodiments functionally include a subset identifier circuit 32 and a transmission controller circuit 34 configured to operate as described below. Additionally or alternatively, these circuits 32, 34 in other embodiments are realized, implemented, or otherwise configured based upon the execution of computer program instructions stored in memory 36 or within another computer readable medium in the entity.

Regardless of particular implementation details, the one or more transmitter processing circuits 30 are configured to identify, from a set of transmission resources that is nominally allocated for transmission of user data upon the first carrier 22, a subset of transmission resources that is also nominally allocated for transmission of a reference or control signal either by the base station 20A upon the second carrier 24 or by the neighboring base station 20B upon the first carrier 22. The one or more transmitter processing circuits 30 are then configured to selectively transmit user data to the wireless device 16A upon the first carrier 22 exclusive of the identified subset of transmission resources.

As used herein, a transmission resource is nominally allocated for a particular transmission, e.g., for transmission of user data by the base station upon the first carrier, or for transmission of a reference or control signal either by the base station upon a second carrier or by a neighboring base station upon the first carrier, in the sense that the resource is designated or planned as being allocated for the particular transmission, but may not actually be allocated in that way. Thus, a transmission resource's nominal allocation may vary from its actual allocation. In fact, selectively transmitting user data on the first carrier 22 exclusive of the identified subset of transmission resources as described above effectively changes the subset's actual allocation as compared to its nominal allocation. Indeed, although the subset is nominally allocated for the transmission of user data upon the first carrier 22, selectively transmitting user data on the first carrier 22 exclusive of that subset means that the subset is not actually allocated for the transmission of user data upon the first carrier 22.

With this understanding, note that the one or more transmitter processing circuits 30 identify the subset as being nominally allocated for both (i) the transmission of user data by the base station 20A upon the first carrier 22; and (ii) the transmission of the reference or control signal either by the base station 20A upon the second carrier 24 or by the neighboring base station 20B upon the first carrier 22. Because the subset is nominally allocated for both of these transmissions, interference would occur between those transmissions, i.e., between the user data and the reference or control signal, if the subset is actually allocated in accordance with the subset's nominal allocation. Selectively transmitting user data on the first carrier 22 exclusive of the subset advantageously prevents or at least mitigates this interference. Indeed, this selective transmission dynamically changes the subset's actual allocation as compared to its nominal allocation so that the subset is not actually allocated for the transmission of user data upon the first carrier 22.

The base station 20A being configured in this way proves advantageous in a number of contexts. Consider for instance embodiments where the subset is nominally allocated for transmission of the reference or control signal by the base station 20A upon the second carrier 24. In this case, the first and second carriers 22, 24 employ overlapping transmission resources. Indeed, this is dictated by the same subset of transmission resources being nominally allocated for both the first and second carriers 22, 24. Regardless, user data is selectively transmitted upon the first carrier 22 exclusive of the identified subset because that user data would have experienced interference on the subset due to the reference or control signal being transmitted upon the second carrier 24 on that subset.

With interference to user data on the first carrier 22 able to be mitigated in this way, the first carrier 22 in at least some embodiments is deployed as a non-legacy carrier, e.g., carrier type B, that overlaps with the second carrier 24 deployed as a legacy carrier, e.g., carrier type A. In this case, the first carrier 22 is deployed for use by wireless devices 16 with non-legacy capabilities, such as the wireless devices 16A and 16C, whereas the second carrier 24 is deployed for use by wireless devices 16 with legacy capabilities, such as the wireless device 16B as well as wireless devices 16A and 16C in embodiments where non-legacy devices also have legacy capabilities. As one example, the reference or control signal is not transmitted upon the first carrier 22 because it is not needed by devices 16, e.g., devices 16A and 16C, with non-legacy capabilities, whereas the reference or control signal is transmitted upon the second carrier 24 because it is needed by devices 16, e.g., device 16B, with only legacy capabilities. Alternatively, the reference of control signal may be transmitted upon the first carrier 22 on a number of transmission resources that is smaller than a number of transmission resources on which the reference or control signal is transmitted upon the second carrier 24. Regardless, deploying the first and second carriers 22, 24 in this overlapping fashion advantageously conserves scarce transmission resources, enables the immediate configuration of the first carrier 22 as a non-legacy carrier, and simplifies the gradual phase out of the second carrier 24 as a legacy carrier.

Next consider other embodiments where the subset is nominally allocated for transmission of the reference or control signal by the neighboring base station 20B upon the first carrier 22. In this case, user data is selectively transmitted upon the first carrier 22 exclusive of the identified subset because user data on the identified subset would have interfered with the reference or control signal being transmitted upon the second carrier 24 on that subset. By mitigating interference to a reference signal transmitted by the neighboring base station 20B on the first carrier 22, for example, the base station 20A enables that reference signal to be used by wireless device 16C for synchronizing to the neighboring base station 20B.

Irrespective of the particular context in which the base station's configuration proves advantageous, the one or more transmitter processing circuits 30 in some embodiments are configured, e g by configuration of the subset identifier circuit 32, to identify the subset by inspecting received control signaling or by retrieving static or dynamic configuration information from memory 36. Moreover, while in at least some embodiments the one or more transmitter processing circuits 30 or subset identifier circuit 32 is simply configured to identify this subset as comprising resources on which user data is not to be transmitted, in other embodiments the one or more transmitter processing circuits 30 or subset identifier circuit 32 is configured to intelligently recognize that the transmission of user data on the subset would interfere or otherwise conflict with the transmission of the reference or control signal on the subset. In either case, of course, the one or more transmitter processing circuits 30 are configured, e g by configuration of the transmission controller circuit 34, to mitigate that interference by selectively transmitting user data via the one or more interfaces 28 upon the first carrier 22 exclusive of the identified subset.

In at least some embodiments, for example, the one or more transmitter processing circuits 30 or transmission controller circuit 34 is configured to selectively transmit user data exclusive of the identified subset by selectively mapping user data upon the first carrier 22 around the identified subset of transmission resources. For instance, where user data on the first carrier 22 is transmitted over a PDSCH, the one or more transmitter processing circuits 30 or transmission controller circuit 34 may map that PDSCH around the identified subset. Regardless, the one or more transmitter processing circuits 30 or transmission controller circuit 34 may proactively take this selective mapping into account when initially generating the amount of user data to be transmitted. In this case, the one or more transmitter processing circuits 30 or transmission controller circuit 34 may be configured to generate the amount of user data to be transmitted to match the actual allocation of transmission resources for user data on the first carrier 22, accounting for the selective mapping of user data around the identified subset of resources. Such matching may entail, for instance, configuring the channel coding rate applicable to the user data to match the actual allocation of transmission resources for the data.

In other embodiments, by contrast, the one or more transmitter processing circuits 30 or transmission controller circuit 34 may be configured to generate the amount of user data to be transmitted to match the nominal (rather than the actual) allocation of transmission resources for user data upon the first carrier 22, without accounting for the selective transmission of user data exclusive of the identified subset of resources. With the amount of user data generated in this way, i.e. to match the nominal allocation of transmission resources, the one or more transmitter processing circuits 30 or transmission controller circuit 34 may then be configured to implement the selective transmission of user data exclusive of the identified subset by puncturing user data on the identified subset of resources. Thus, in this case, the one or more transmitter processing circuits 30 or transmission controller circuit 34 is configured to refrain from transmitting some of the user data previously generated, as necessary to avoid transmitting user data on the identified subset of resources. This puncturing proves to mitigate the abovementioned interference without substantially affecting the device's receipt of the user data, given the channel coding protection applied to the user data.

Because the one or more transmitter processing circuits 30 or transmission controller circuit 34 is configured to selectively transmit user data to the wireless device 16A on less than the full set of transmission resources nominally allocated for use on the first carrier 22, the one or more transmitter processing circuits 30 or transmission controller circuit 34 is configured to, in at least some embodiments, transmit information to the device 16A that explicitly or implicitly indicates the selective nature of the data transmission. This way, the wireless device 16A may adjust or otherwise configure its receipt of the user data to account for the fact that user data is not transmitted on the full set of resources nominally allocated for the first carrier 22.

In at least some embodiments, for example, the one or more transmitter processing circuits 30 or transmission controller circuit 34 is configured to transmit, via the one or more interfaces 28, information that explicitly identifies the subset of resources to the wireless device 16A as not having user data. As one example, where the subset of resources is nominally allocated for transmission of a reference signal, either by the base station 20A on the second carrier 24 or by the neighboring base station 20B on the first carrier 22, those resources are structured in a repetitive pattern that can be indicated. The one or more transmitter processing circuits 30 or transmission controller circuit 34 may transmit such an indication as a muting pattern to inform the device 16A that transmissions on the subset of resources have been muted, i.e., transmitted with little or no power. Since in this example the subset of resources is nominally allocated for a reference signal, this muting pattern may resemble and be treated by the device 16A as a reference signal muting pattern on the first carrier 22.

Additionally or alternatively in other embodiments, the one or more transmitter processing circuits 30 or transmission controller circuit 34 may transmit information that explicitly indicates the transmission resources actually allocated for user data on the first carrier 22, accounting for the exclusion of the identified subset of resources. For example, in some embodiments, the information explicitly indicates an initial transmission resource actually allocated for user data on the first carrier 22, with subsequent transmission resources actually allocated for user data being derivable by the wireless device 16A from that indication and earlier resources being included in the identified subset.

Consider, for instance, embodiments where a transmission resource comprises a time-frequency resource, e.g., a resource element in LTE, and where the subset of resources is nominally allocated for transmission of a control signal by the base station on a second carrier. In this case, the one or more transmitter processing circuits 30 or subset identifier circuit 32 may determine that one or more transmission resources at the start of a subframe are included in the identified subset of resources, and are thus not to be actually allocated for user data transmission. The one or more transmitter processing circuits 30 determines, by subset identifier circuit 32, the first transmission resource that occurs next in the subframe, i.e., next in time after the "control signal" resources, and signals, by transmission controller circuit 34, that resource to the device 16A as being the start of user data in the subframe. That is, the one or more transmitter processing circuits 30 transmit, via the one or more interfaces 28, information that explicitly identifies, for a given subframe, the first transmission resource from the start of the given subframe that is not included in the identified subset. In doing so, the one or more transmitter processing circuits 30 effectively exclude the resources in the identified subset from being considered as user data by the device 16A.

In still other embodiments, the above techniques may be combined to explicitly signal a portion of the subset of resources as not having user data, and to explicitly signal resources actually allocated for user data on the first carrier 22 as a way to implicitly signal another portion of the subset. Such embodiments may prove useful, for instance, when one portion of the subset corresponds to resources allocated for transmission of a reference signal, e.g., CRS, on the second carrier 24, and another portion of the subset corresponds to resources allocated for transmission of a control signal, e.g., PDCCH, on the second carrier 24.

In at least some embodiments, however, wireless devices 16 configured to receive this second carrier 24, such as legacy devices and in some embodiments also non-legacy devices, may operate under the assumption that the second carrier 24 is protected by a guard band. In this case, reception of the second carrier 24 may suffer if resources nominally allocated for exclusive use by the first carrier 22 infringe on the assumed second carrier guard band, i.e., because they are adjacent to resources nominally allocated for use by both the first and second carriers 22, 24. Accordingly, the one or more transmitter processing circuits 30 in some embodiments also identify, e g by subset identifier circuit 32, from the set of transmission resources nominally allocated for transmission of user data upon the first carrier 22, a second subset of transmission resources that are exclusively allocated for transmissions upon the first carrier 22 but that are adjacent to transmission resources nominally allocated for transmission on the second carrier 24. Based on this identification, the one or more transmitter processing circuits 30 selectively transmit, e g by transmission controller circuit 34 via the one or more interfaces 28, user data on the first carrier 22 exclusive of both the first and second subsets of resources. This identification and selective transmission effectively creates a virtual guard band around the second carrier 24 that is static regardless of whether the resources nominally allocated for transmission, e.g., of any type of signal or data, on the second carrier 24 are actually allocated.

Further sophistications in this regard therefore include the one or more transmitter processing circuits 30 identifying a second subset of resources that are adjacent to resources actually (as opposed to just nominally) allocated for transmission on the second carrier 24. In this case, selective transmission amounts to adjusting on which resources user data is actually scheduled for transmission on the first carrier 22. The effect of this may be that the virtual guard "band" created does not extend uniformly across the entire transmission bandwidth.

In view of the above modifications and variations, those skilled in the art will appreciate that a base station 20A herein may be statically configured to perform the identification and selective transmission described, without necessarily knowing that it is doing so in order to mitigate interference. That is, the base station 20A may not necessarily know that the identified subset of resources has been nominally allocated for transmission of a reference or control signal either by the base station 20A on a second carrier 24 or by a neighboring base station 20B on the first carrier 22; the base station 20A may simply understand that it is not to transmit user data on that subset of resources.

In more sophisticated embodiments, by contrast, the base station 20A indeed has this knowledge. In this case, the base station 20A may identify the subset of resources occasionally or periodically, in order to dynamically adjust its selective transmission of user data as needed to mitigate interference under changing circumstances.

Consider, for instance, embodiments wherein the subset of resources corresponds to resources allocated for transmission of a reference or control signal by the base station 20A on a second carrier 24, and where the second carrier 24 comprises a legacy carrier and the first carrier 22 comprises a non-legacy carrier. In this case, the base station 20A may be configured to dynamically adjust its selective transmission of user data responsive to the presence or absence of legacy devices, such as wireless device 16B. For example, the base station 20A may dynamically discontinue selective transmission of user data on the first carrier 22, i.e. stop avoiding transmitting user data to the wireless device 16A on the identified subset of transmission resources upon the first carrier 22, responsive to the number of legacy devices being served falling below a predefined threshold. In this way, the embodiments provide for a gradual phasing out of the legacy carrier 24 as device population migrates from legacy to non-legacy, while at the same time permitting immediate and resource efficient rolling out of the non-legacy carrier 22. These same advantages may be realized of course in the static embodiments mentioned above, but in that case would require external (e.g., manual) configuration.

In view of the above, those skilled in the art will also appreciate counterpart configuration of a wireless device 16A herein. In this regard, FIG. 9 depicts a wireless device 16A in a wireless communication system 10 configured to receive user data from a base station 20A on a first carrier 22.

Figure 9:
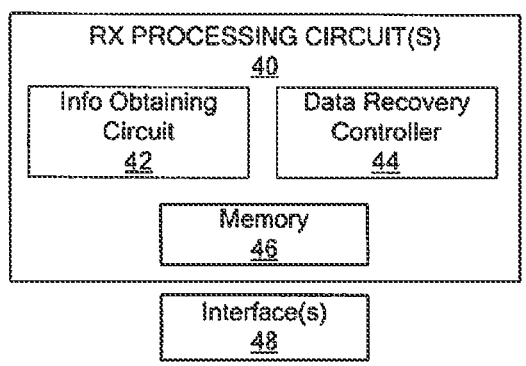
FIG. 9 is a block diagram of a wireless device configured to receive user data from a base station upon a first carrier according to one or more embodiments.

According to FIG. 9, the wireless device 16A includes one or more interfaces 48, one or more receiver (RX) processing circuits 40, and one or more additional processing circuits (not shown). The one or more interfaces 48 are configured to communicatively couple the device 16A to the base station 20A, e.g., via an air interface.

The one or more receiver processing circuits 40 in some embodiments functionally include an information obtaining circuit 42 and a data recovery controller circuit 44 configured to operate as described below. Additionally or alternatively, these circuits 42, 44 in other embodiments are realized, implemented, or otherwise configured based upon the execution of computer program instructions stored in memory 46 or within another computer readable medium in the entity.

Regardless of particular implementation details, the one or more receiver processing circuits 40 are configured, e g by configuration of the information obtaining circuit 42, to obtain information indicating that the base station 20A is selectively transmitting user data to the wireless device 16A upon the first carrier 22 exclusive of a subset of a set of transmission resources that is nominally allocated for user data upon the first carrier 22. This subset of transmission resources, as discussed above, is also nominally allocated for transmission of a reference or control signal either by the base station 20A upon the second carrier 24 or by the neighboring base station 20B upon the first carrier 22. Obtaining information about this subset of resources may entail inspecting control signaling received from the base station 20A, e.g., consistent with the various indications described above with respect to the base station 20A, such as a muting pattern or initial user data resource, or retrieving configuration information from memory 46.

In any case, the one or more receiver processing circuits 40 are also configured, e g by configuration of the data recovery controller circuit 44, to, based on the obtained information, recover user data received upon the first carrier 22 exclusive of the subset of transmission resources. That is, even though the subset of transmission resources is nominally allocated for use by the first carrier 22, the wireless device 16A does not actually recover user data from those resources.

In at least some embodiments, for example, recovering of user data exclusive of the subset of resources entails demapping user data on the first carrier 22 exclusive of, i.e., around, that subset. For instance, where user data on the first carrier 22 is received over a PDSCH, the wireless device 16A demaps that PDSCH around the subset of resources.

In other embodiments, by contrast, recovering of user data exclusive of the subset of resources involves demapping user data on the first carrier 22 inclusive of the subset of resources, but setting soft information for decoding to indicate that user data demapped from the subset is unreliable. This setting of soft information may comprise, for instance, setting soft symbol values for user data demapped from the subset of resources to a value of 0.

Figure 10:
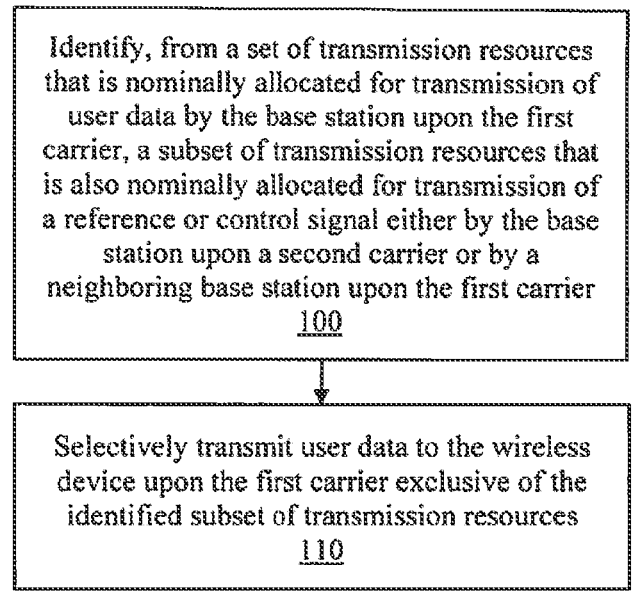
FIG. 10 is a logic flow diagram of a method implemented by a base station for transmitting user data to a wireless device upon a first carrier according to one or more embodiments.

In view of the above described configuration of the base station 20A and wireless device 16A, those skilled in the art will appreciate that the base station 20A herein implements the method shown in FIG. 10 for transmitting user data to the wireless device 16A upon the first carrier 22, e.g., for transmitting the PDSCH/ePDCCH on carrier type B. As shown in FIG. 10, processing according to the method entails identifying, from a set of transmission resources nominally allocated for transmission of user data by the base station 20A upon the first carrier 22, a subset of transmission resources that is also nominally allocated for transmission of a reference or control signal, either by the base station 20A upon the second carrier 24, e.g., on carrier type A, or by the neighboring base station 20B upon the first carrier 22 (Block 100). The method then includes selectively transmitting user data to the wireless device 16A on the first carrier 22 exclusive of the identified subset of transmission resources (Block 110). That is, even though the subset of transmission resources is nominally allocated for use by the first carrier 22, the base station 20A does not actually allocate or otherwise use those resources of the subset for user data (or for anything else).

Those skilled in the art will also appreciate counterpart processing performed by a wireless device 16A herein. In this regard FIG. 11 depicts processing performed by a wireless device 16A in a wireless communication system 10 for receiving user data from the base station 20A upon the first carrier 22.

Figure 11:
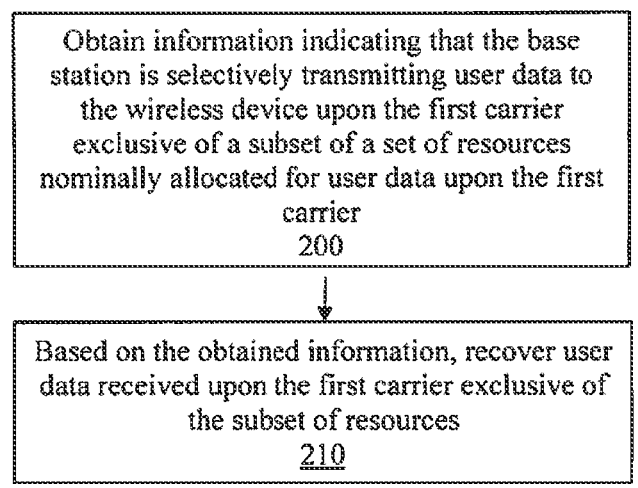
FIG. 11 is a logic flow diagram of a method implemented by a wireless device for receiving user data from a base station upon a first carrier according to one or more embodiments.

As shown in FIG. 11, processing at the wireless device 16A includes obtaining information indicating that the base station 20A is selectively transmitting user data to the wireless device 16A on the first carrier 22 exclusive of a subset of a set of transmission resources nominally allocated for user data upon the first carrier (Block 200). Consistent with the above, this subset of resources is nominally allocated for transmission of a reference or control signal either by the base station 20A on the second carrier 24 or by the neighboring base station 20B on the first carrier 22. Obtaining information about this subset of resources may entail inspecting control signaling received from the base station 20A (e.g., consistent with the various indications described above with respect to the base station 20A, such as a muting pattern or initial user data resource) or retrieving configuration information from memory 46.

In any case, processing continues, based on the obtained information, with recovering user data received upon the first carrier 22 exclusive of the subset of transmission resources (Block 210). That is, even though the subset of transmission resources is nominally allocated for use by the first carrier 22, the wireless device 16A does not actually recover user data from those resources.

Those skilled in the art will also appreciate that no particular wireless communication technology or standard is required for practicing the above embodiments. Nonetheless, in order to provide various concrete examples, one or more embodiments will now be described in a context where the wireless communication system 10 is based on Long Term Evolution (LTE). In these one or more LTE embodiments, the transmission resources comprise time-frequency resource elements, the reference or control signal comprises common reference symbols (CRS) or a physical downlink control channel, and user data is transmitted upon the first carrier 22 over a physical downlink shared channel (PDSCH). Moreover, in at least some of these embodiments, the first carrier 22 is the non-legacy carrier, e g carrier type B, and the second carrier 24 is the legacy carrier, e g carrier type A. Furthermore, using LTE terminology, wireless devices 16 are referred to as user equipments (UEs), and base stations 20 are referred to as enhanced NodeB's (eNBs).

In this context, it is a problem for an operator that would like to deploy a carrier of carrier type B in an existing band where a carrier type A is already deployed. The operators need a mechanism to handle the large amount of UE not being able to support carrier type B in the initial stages and a migration solution when the balance between the number of terminals supporting carrier type A and B changes over time.

A similar problem exists for an operator that would like to deploy a carrier of carrier type B in neighboring cells. Indeed, in one configuration of carrier type B, CRS for demodulation purpose are not transmitted in every subframe but shortened or modified CRS may be transmitted in every fifth subframe or tenth slot to assist UE acquiring synchronization with the additional carrier. With such a setup the reuse factor of the CRS for the purpose of synchronization is 6, i.e., 6 shifts in frequency, which means that in a network with many cells there will be CRS-to-CRS interference. Secondly it is further possible that the PDSCH/eCCH from a neigboring cell will interfere with the CRS, where eCCH refers to the enhanced control channel (at the transport channel level). These two examples of neighbor cell interference may limit the performance of an additional carrier especially in a HetNet environment with many interfering sources.

Limiting Non-Legacy Carrier PDSCH Interference to Legacy Carrier CRS and PDCCH

One or more embodiments herein allow legacy UEs and newer UEs to coexist on a single carrier frequency. In one embodiment, the legacy and newer carrier types are transmitted in an overlapping fashion. The CRS are only transmitted in the PRBs used by the legacy carrier. PDSCH mapping or UE decoding adapts to avoid interference of CRS to decoding of PDSCH. The start symbols used for the PDSCH are varied depending on whether the PRB pair is used by the legacy UEs in order to adapt to the presence of legacy PDCCH transmissions. Transmission on PRB pairs is also adapted to effectively provide guard bands around the part of the carrier that is used by legacy UEs.

More particularly, at a first stage when deploying a carrier type B, the eNB will transmit carrier type A at the same frequency in an overlapping fashion but with a smaller bandwidth than carrier type B. This will ensure that both legacy UEs supporting only carrier type A and new UEs supporting both carrier type B and A or only carrier type B can access the network. New UE supporting both carrier type B and A or only carrier type B can gain the benefits of using carrier type B.

Figure 12:
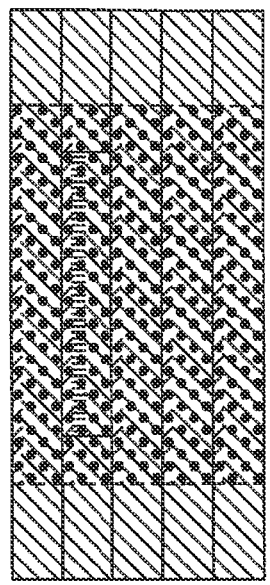
FIG. 12 shows carrier type A as transmitted centralized within carrier type B according to one or more embodiments from the perspective of a base station.

In the first embodiment, carrier types A and B are transmitted from the eNB on the same frequency in a partly overlapping manner. In FIG. 12, the case when carrier type A is transmitted centralized within carrier type B is illustrated from an eNB perspective. This example should not be limiting but viewed as one possible implementation. This embodiment distinguishes itself from known approaches because, in those approaches, carrier types A and B are not divided into different bandwidths parts. Instead, in embodiments herein, carrier types A and B are separately defined carriers that are transmitted on the same frequency.

Figure 13:
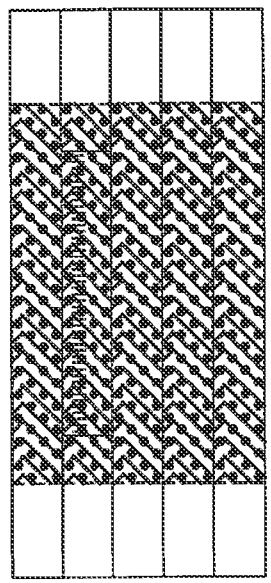
FIG. 13 shows carrier type A as seen from a legacy wireless device according to one or more embodiments.

From the UE perspective we have two points of view, either a UE that receives carrier type A or a UE that receives carrier type B. A UE that receives carrier type A, i.e. a legacy UE, is not aware that carrier type B exists and hence it will observe carrier type A as only being deployed without any carrier type B present. FIG. 13 illustrates carrier type A as seen from a legacy UE.

Figure 14:
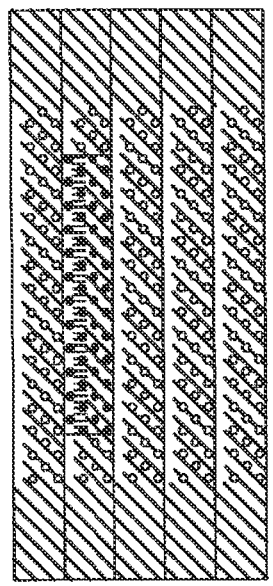
FIG. 14 shows carrier type B in the presence of carrier type A as seen from a wireless device capable of receiving carrier type B.

A UE that is receiving carrier type B will however need to be aware in some manner that carrier type A exists in the middle of the allocated spectrum. This is to ensure that such UE knows which REs carry its PDSCH/eCCH. The key aspect that such a UE needs to know is the REs on which CRS are transmitted upon carrier type A because the PDSCH and eCCH bits are not transmitted on these REs upon carrier type B. FIG. 14 illustrates carrier type B in the presence of a carrier type A as seen from a UE capable of receiving carrier type B.

Figure 15:
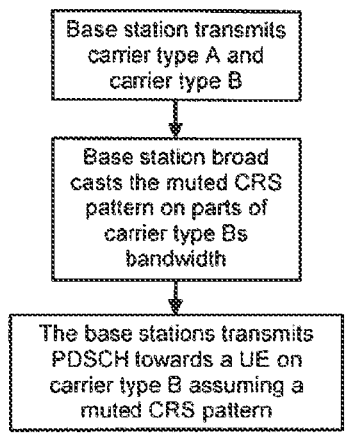
FIG. 15 is a logic flow diagram of a method performed by a base station according to one or more embodiments.
Figure 16:
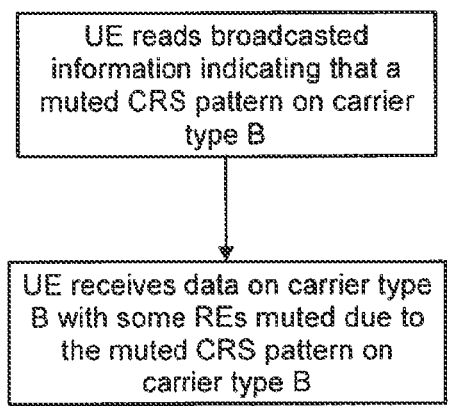
FIG. 16 is a logic flow diagram of a method performed by a wireless device according to one or more embodiments.

In a second embodiment the eNB configures the UE either by dedicated signal or broadcast information to make known which REs are used for CRS on carrier type A, i.e. a CRS muting pattern. FIG. 15 illustrates this as a flow chart of broadcasting the CRS muting pattern in the base station. Correspondingly, FIG. 16 illustrates this as a flow chart of a terminal receiving information about muted CRS in the base station.

The UE and eNB can use this information in two different ways.

In a first option the eNB maps the PDSCH around the muted REs when transmitting PDSCH/eCCH to a UE. When receiving the PDSCH or ePDCCH, ePHICH, the UE will use the information that some REs are muted by the eNB and correspondingly adjusts its demapping of the PDSCH taking into account that the eNB did not map PDSCH to certain REs.

In a second approach the PDSCH/eCCH bits in total amount is generated without considering whether there are some REs that should not contain any PDSCH/eCCH. The mapping of the PDSCH/eCCH may be done in such a way that the eNB when it comes to muted REs skips to map out this corresponding symbol on that RE, but forwards its counter to the next symbol for placement in the next REs. That is, some of the PDSCH/eCCH bits are punctured and never transmitted by the eNB. Other implementations that create a punctured PDSCH/eCCH realize the same embodiment. The UE will demap all symbols not considering that certain symbols do not contain either PDSCH or eCCH. For the UE configured with the muting pattern by the eNB it will be able to enhance its decoding performance by setting the soft value symbols corresponding to muted REs to 0 or to a similar value that indicates that the soft values derived from these symbols are very unreliable.

In a third embodiment the eNB configures the UE either in a UE-specific manner or through broadcast with the starting OFDM symbol in a subframe of PDSCH and/or eCCH configured differently for different PRB pairs. This is to enable a UE receiving PDSCH or eCCH from carrier type B to take into account the presence of PDCCH/PHICH/PCFICH on carrier type A. Similar to in embodiment 2, this may be done in two ways considering both the eNB and UE implementations. The signaling scheme may for example be turned into practice as follows. The UE by default assumes that the PDSCH/eCCH maps from the first OFDM symbol and the eNB may additionally indicate through signaling a set of the PRB pairs that has a different starting OFDM symbol for PDSCH/eCCH.

In a first option, the eNB selects the first OFDM symbol to map the PDSCH/eCCH on carrier type B for a certain PRB pair as part of the configuration in the UE for the first set of PRB pairs and another first OFDM symbol for a second set of PRB pairs. The configured value in the terminal may for example be OFDM symbol 1, 2, 3 or 4. The UE when demapping the PDSCH/eCCH assumes the same RE mapping as the eNB. The starting OFDM symbol of PDSCH/eCCH may also be derived by other mechanisms by the UE for example reading PCFICH, ePCFICH or a MAC control element.

In a second option the eNB maps out PDSCH/eCCH for carrier type B from the first OFDM symbol assuming that PDCCH/PCFICH/PHICH from the carrier type A does not exist. If some REs contain both PDSCH/eCCH from carrier type B and PDCCH/PHICH/PCFICH from carrier type A, the eNB will transmit PDCCH/PHICH/PCFICH belonging to carrier type A in those REs. The UE may be configured with the knowledge that eNB may transmit something different than the PDSCH/eCCH in the first few beginning OFDM symbols within some of its PRB pairs. These signaled values may for example be 1, 2, 3 or 4. Similar as in the first option the UE can retrieve this knowledge by reading PCFICH, ePCFICH or a MAC control element. The UE may use this information in its receiver to set the corresponding soft value that are de-mapped from the first OFDM symbols to the value 0 or to a similar value that indicates that the soft value derived there is very unreliable.

It is up to the UE implementation to figure out if PDSCH/eCCH are actually transmitted in earlier OFDM symbols as configured and to use these symbols for improved reception. A baseline UE would only follow the eNB configuration.

That is, a simple UE would only monitor the length of PDCCH by detecting for example PCFICH on its own carrier.

Figure 17:
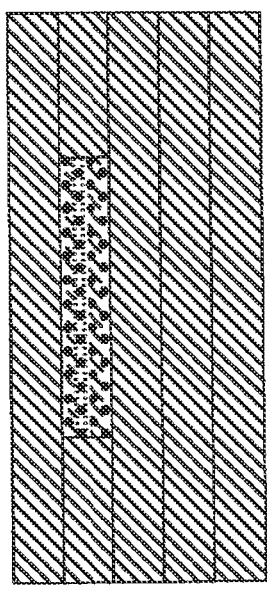
FIG. 17 shows common reference symbols being transmitted on carrier type B for synchronization purposes every fifth subframe and only on the center physical resource block pairs.

Assuming a network deployment where several eNBs transmit both carrier type A and carrier type B according to FIG. 17 (described below), together with UEs operating that can only receive carrier type A, UEs designed only to receive carrier type A will suffer a significant performance degradation if carrier type A and carrier type B are transmitted as in FIG. 17, because the filter designed in such a UE assumes the presence of guard band at each end of the system bandwidth. If the guard band is not present, the UE will receive its desired downlink signal as well as transmissions from neighboring cells in the form of increased interference. How much guard band the UE will assume is defined in TS 36.101 V10.5.0 in table 5.6-1. The guard band is defined by taking the difference between the channel bandwidth and the transmission bandwidth configuration. For completeness the same table is also replicated as Table 1 in FIG. 18, together with the transmission bandwidth.

Figure 19:
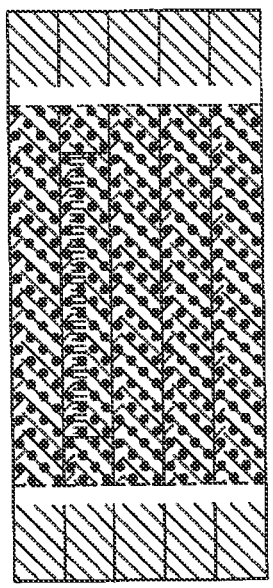
FIG. 19 shows the creation of a virtual guard band around carrier type A according to one or more embodiments.

In a fourth embodiment, the eNB needs to have no or reduced scheduling activity in PRB pairs located in frequency close to carrier type A but within carrier type B, particularly in those PRB pairs currently scheduled within carrier A close to the carrier A edge. This is illustrated in FIG. 19, where a virtual guard band has been introduced by the eNB by reducing the scheduling activity on the specific PRB pairs that are next to carrier type A. This is to create virtual guard band(s) to protect the UEs that are only receiving carrier type A from receiving additional interference.

The creating of virtual guard bands can be done in two ways. In both ways, the PRB pairs in the virtual guard band are excluded from the transmission bandwidth. In the first option, the PRB pairs in the virtual guard band do not have RB indexing numbers. Since they are not even accessible by the PDSCH resource allocation or ePDCCH configuration, they cannot be scheduled or used and no signals are transmitted there.

In the second possibility of creating virtual guard bands, PDSCH is not scheduled or is reduced in these guard bands. Furthermore, CSI-RS transmission may be transmitted with zero power (muted) in this guard bands to protect UEs receiving only carrier type A.

The embodiments outlined here thus makes a transition between legacy and new carrier types smoother as it will enable both legacy UEs and new UEs able to access the spectrum during a given time frame. At the same time the solution provides the new UEs capable of receiving a new carrier type to be tested early with its unique functionality to ensure that they can be deployed as early as possible in the network.

Limiting Non-Legacy Carrier PDSCH Interference to Non-Legacy Carrier CRS in Neighboring Cell One or more other embodiments herein limit the extent to which the PDSCH/eCCH from one cell, or one base station, will interfere with the CRS of another cell, or another base station. In particular, the eNB transmitting in the network should avoid mapping PDSCH on to REs that are used for CRS for synchronization purposes in another eNB. For example, in some embodiments, muted CRS patterns are used at the eNB to avoid transmission of PDSCH on REs used by other eNBs for CRS in order to avoid PDSCH to CRS interference that may degrade synchronization capabilities. Muted CRS may be used to occupy entire OFDM symbols or they could be spread across subframes in time. A combination of both techniques may also be used to ensure a high degree of reuse for the CRS used for synchronization.

In a first embodiment the eNB does not map any PDSCH toward any OFDM symbol containing CRS for synchronization purposes. This will aid UEs in neighboring cells in performing synchronization as they will not see any PDSCH-to-CRS interference. The limit on which OFDM symbols to map PDSCH toward can also be amended by only applying the limit to certain number of PRB pairs, typically the same PRB pairs that also contain CRS for synchronization purposes. FIG. 17 illustrates the case when CRS transmitted for synchronization purpose are transmitted every fifth subframe and only occupy the center PRB pairs. In the example in the figure PDSCH are not mapped to the OFDM symbols in the PRBs which contains the CRS for synchronization purposes.

Figure 20:
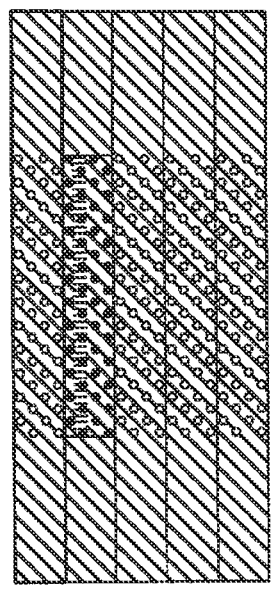
FIG. 20 shows selective mapping of PDSCH around certain CRS locations according to one or more embodiments.
Figure 20:
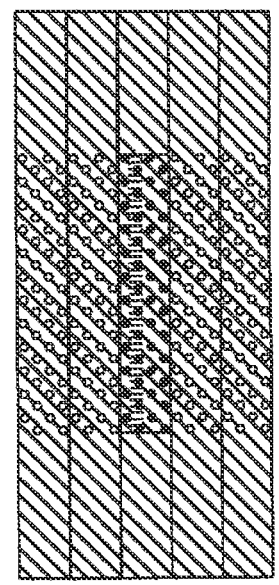
Figure 20:
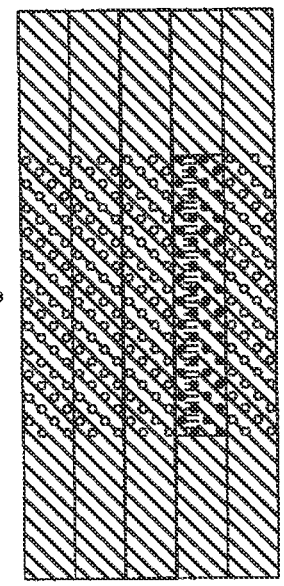
Figure 20:
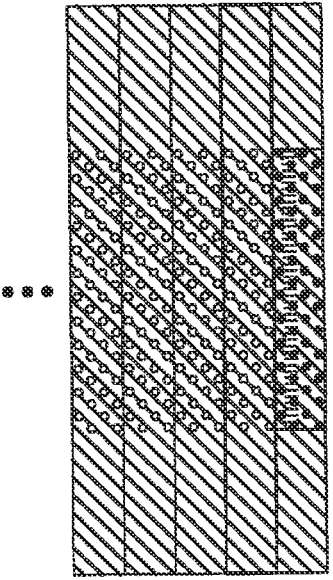

In a second embodiment a further frequency reuse is created by muting CRS locations in other OFDM symbols as well, this in order to more uniquely be able to configure each eNB so that there will be very small probability that a UE will see CRS-to-CRS interference. An example of this is shown in FIG. 20 where certain CRS locations do not have any PDSCH mapped on to it. That is, muted CRS positions are mapped out in time in FIG. 20.

Embodiments 1 and 2 can further also be combined and performed together at the same time.

When performing embodiment 1 and 2, the actual PDSCH/eCCH mapping at the eNB can be done in two different ways. In a first method the PDSCH/eCCH bits in total amount are generated assuming that certain REs will not contain any PDSCH/eCCH. The mapping is essentially done around the holes created by the muting pattern. In a second method the PDSCH/eCCH bits in total amount are generated without considering whether there are some REs that should not contain any PDSCH/eCCH. The mapping of the PDSCH/eCCH can be done so that the eNB when it comes to muted REs skips the mapping out of this corresponding symbol on that RE, but forwards its counter to the next symbol for placement in the next REs. That is, some of the PDSCH/eCCH bits are punctured and never transmitted by the eNB. Other implementations that create a punctured PDSCH/eCCH realize the same embodiment.

In the UE receiver the UE will for the first method consider in its demapping that certain REs do not contain any PDSCH/eCCH, i.e. the UE will use a different demapping function of symbols if CRS muting pattern is configured as compared to the absence of CRS muting patterns. For the second method the UE will demap all symbols not considering that certain symbols do not contain either PDSCH or eCCH. The UE will however when configured with the muting pattern by the eNB be able to enhance its decoding performance by setting the soft value symbols corresponding to muted REs to 0 or to a similar value that indicates that the soft value derived there is very unreliable.

Irrespective of whether described in an LTE context or not, note that the term "subset" is used herein in its general sense to refer to a part or portion of a larger set. This contrasts with the purely mathematical sense of the term in which a subset may be the same as the set. In mathematical terms, a "subset" as used herein is really a "proper subset."

The present invention may, of course, be carried out in other specific ways than those herein set forth without departing from the scope and essential characteristics of the invention. The present embodiments are, therefore, to be considered in all respects as illustrative and not restrictive.

What is claimed is:

1. A base station for a wireless communication system configured to transmit user data to a wireless device upon a first carrier, the base station comprising:
one or more interfaces configured to communicatively couple the base station to the wireless communication system, and
one or more processing circuits configured to:
identify, from a set of transmission resources nominally allocated for transmission of user data by the base station upon the first carrier, a subset of transmission resources also nominally allocated for transmission of a reference signal upon a second carrier; and
selectively transmit the user data to the wireless device upon the first carrier exclusive of the identified subset of transmission resources, wherein the first carrier is of a type upon which said reference signal is not transmitted.

2. The base station of claim 1, wherein said one or more processing circuits are configured to selectively transmit the user data by selectively mapping the user data upon the first carrier around the identified subset of transmission resources.

3. The base station of claim 2, wherein said one or more processing circuits are further configured to:
generate an amount of user data to be transmitted to match an actual allocation of transmission resources for user data upon the first carrier;
wherein the actual allocation accounts for the selective mapping of the user data around the identified subset of transmission resources.

4. The base station of claim 1, wherein said one or more processing circuits are configured to selectively transmit the user data by puncturing user data from the identified subset of transmission resources.

5. The base station of claim 4, wherein said one or more processing circuits are further configured to:
generate an amount of user data to be transmitted to match the nominal allocation of transmission resources for user data upon the first carrier;
wherein the nominal allocation does not account for the selective transmission of user data exclusive of the identified subset of transmission resources.

6. The base station of claim 1, wherein the one or more processing circuits are further configured to transmit information to the wireless device that explicitly or implicitly indicates selective transmission of the user data upon the first carrier exclusive of the identified subset of transmission resources.

7. The base station of claim 6, wherein the information explicitly identifies at least a portion of the subset of transmission resources to the wireless device as not having user data for the wireless device.

8. The base station of claim 7, wherein the information comprises a reference signal muting pattern.

9. The base station of claim 6, wherein the information explicitly identifies, for a given subframe, a first transmission resource from a start of the given subframe that is not included in the identified subset of transmission resources.

10. The base station of claim 1, wherein the one or more processing circuits are further configured to:
identify, from the set of transmission resources, a second subset of transmission resources that is exclusively allocated for transmission of user data upon the first carrier but that is adjacent to transmission resources nominally or actually allocated for transmission upon the second carrier;
selectively transmit the user data by selectively transmitting the user data upon the first carrier also exclusive of the identified second subset of transmission resources to create one or more virtual guard bands around the second carrier.

11. The base station of claim 1, wherein the second carrier comprises a legacy carrier and the first carrier comprises a non-legacy carrier, and wherein the one or more processing circuits are further configured to dynamically discontinue selective transmission of the user data upon the first carrier responsive to a number of legacy wireless devices being served falling below a predefined threshold.

12. The base station of claim 1, wherein the second carrier comprises a legacy carrier and the first carrier comprises a non-legacy carrier.

13. The base station of claim 1, wherein the user data is selectively transmitted to the wireless device upon the first carrier over a physical downlink shared channel.

14. A wireless device for a wireless communication system configured to receive user data from a base station upon a first carrier, the wireless device comprising:
one or more interfaces configured to communicatively couple the wireless device to the base station;
one or more processing circuits configured to:
obtain information indicating that the base station is selectively transmitting the user data to the wireless device upon the first carrier exclusive of a subset of a set of transmission resources nominally allocated for user data upon the first carrier, wherein the subset of transmission resources is also nominally allocated for transmission of a reference signal upon a second carrier; and
based on the obtained information, recover the user data received upon the first carrier exclusive of the subset of transmission resources, wherein the first carrier is of a type upon which said reference signal is not transmitted.

15. The wireless device of claim 14, wherein the one or more processing circuits are configured to recover the user data by demapping the user data exclusive of the subset of transmission resources.

16. The wireless device of claim 14, wherein the one or more processing circuits are configured to recover the user data by:
demapping the user data from the set of transmission resources nominally allocated for user data; and
setting soft information for decoding to indicate that the user data demapped from the subset of transmission resources is unreliable.

17. The wireless device of claim 14, wherein the obtained information explicitly identifies at least a portion of the subset of the set of transmission resources to the wireless device as not having user data for the wireless device.

18. The wireless device of claim 17, wherein the obtained information comprises a reference signal muting pattern.

19. The wireless device of claim 14, wherein the obtained information explicitly identifies, for a given subframe, a first transmission resource from a start of the subframe that is not included in the subset of the set of transmission resources.

20. The wireless device of claim 14, wherein the second carrier comprises a legacy carrier and the first carrier comprises a non-legacy carrier.

21. The wireless device of claim 14, wherein the user data is selectively transmitted upon the first carrier over a physical downlink shared channel.

22. A method implemented by a base station in a wireless communication system for transmitting user data to a wireless device upon a first carrier, the method comprising:
- identifying, from a set of transmission resources nominally allocated for transmission of user data by the base station upon the first carrier, a subset of transmission resources also nominally allocated for transmission of a reference signal upon a second carrier; and
- selectively transmitting the user data to the wireless device upon the first carrier exclusive of the identified subset of transmission resources, wherein the first carrier is of a type upon which said reference signal is not transmitted.

23. A method implemented by a wireless device in a wireless communication system for receiving user data from a base station upon a first carrier, the method comprising:
- obtaining information indicating that the base station is selectively transmitting the user data to the wireless device upon the first carrier exclusive of a subset of a set of transmission resources nominally allocated for user data upon the first carrier, wherein the subset of the set of transmission resources is also nominally allocated for transmission of a reference signal upon a second carrier; and
- based on the obtained information, recovering the user data received upon the first carrier exclusive of the subset of transmission resources, wherein the first carrier is of a type upon which said reference signal is not transmitted.

* * * * *